(12) United States Patent
Burke et al.

(10) Patent No.: US 12,040,642 B1
(45) Date of Patent: Jul. 16, 2024

(54) HIGH CAPACITY BATTERY CHARGER WITH ROBUST ADAPTER SUPPORT

(71) Applicant: Bren-Tronics, Inc., Commack, NY (US)

(72) Inventors: Peter J. Burke, East Northport, NY (US); Daniel Sha, Farmingdale, NY (US); Tullio Clemente, Port Washington, NY (US); Steven Chew, East Northport, NY (US); Peter Carcaterra, West Islip, NY (US); Eric Kaminski, Middle Island, NY (US); Jarred Kahn, Babylon, NY (US); Sai Fung, Melville, NY (US)

(73) Assignee: Bren-Tronics, Inc., Commack, NY (US)

( * ) Notice: Subject to any disclaimer, the term of this patent is extended or adjusted under 35 U.S.C. 154(b) by 85 days.

(21) Appl. No.: 17/449,724

(22) Filed: Oct. 1, 2021

Related U.S. Application Data

(62) Division of application No. 17/018,485, filed on Sep. 11, 2020, now Pat. No. 11,165,207, which is a division of application No. 16/415,215, filed on May 17, 2019, now Pat. No. 10,804,661.

(60) Provisional application No. 62/673,663, filed on May 18, 2018.

(51) Int. Cl.
| | |
|---|---|
| *H02J 7/00* | (2006.01) |
| *H01R 13/627* | (2006.01) |
| *H01R 13/633* | (2006.01) |

(52) U.S. Cl.
CPC ........ *H02J 7/0042* (2013.01); *H01R 13/6275* (2013.01); *H01R 13/633* (2013.01); *H02J 7/0045* (2013.01)

(58) Field of Classification Search
None
See application file for complete search history.

(56) References Cited

U.S. PATENT DOCUMENTS

| | | | |
|---|---|---|---|
| 1,841,736 A | 1/1932 | Jones | |
| 2,420,754 A | 5/1947 | MacFadden | |
| 2,430,011 A | 11/1947 | Gillentine | |
| 2,525,210 A | 10/1950 | Del Camp | |
| 6,049,191 A * | 4/2000 | Terazoe | B60L 53/12 320/108 |
| 7,556,511 B1 | 7/2009 | Hsu | |
| 8,018,198 B2 | 9/2011 | Meyer | |
| 8,633,824 B2 | 1/2014 | Miwa | |
| 8,786,254 B2 | 7/2014 | Ogura | |
| 9,166,417 B2 | 10/2015 | Marmatsu | |
| 9,634,503 B2 | 4/2017 | Taga | |

* cited by examiner

*Primary Examiner* — Robert Grant
(74) *Attorney, Agent, or Firm* — Keusey & Associates, P.C.

(57) ABSTRACT

A high capacity battery charger includes multiple sockets to connect to a variety of different battery-receiving adapters. Each socket includes a multi-slot female connector and a planar flange that surrounds the connector for securing to a wiring harness and the top support deck of the charger chassis. A pivoting latch facilitates plugging and unplugging the multi-blade adapters into the sockets. An electromagnetic shield covers the power supply and includes a wing extending toward the central axis of a cooling fan.

23 Claims, 10 Drawing Sheets

HIGH CAPACITY BATTERY CHARGER WITH ROBUST ADAPTER SUPPORT

CROSS REFERENCE TO RELATED APPLICATION

This application is a Divisional of U.S. patent application Ser. No. 17/018,485 entitled High Capacity Battery Charger With Robust Adapter Support filed Sep. 11, 2020, now U.S. Pat. No. 11,165,207, which is a Divisional of U.S. patent application Ser. No. 16/415,215 entitled High Capacity Battery Charger With Robust Adapter Support filed May 17, 2019, now U.S. Pat. No. 10,804,661, which claims the benefit under 35 U.S.C. § 119(e) from U.S. Provisional Patent Application No. 62/673,663 entitled High Capacity Battery Charger with Robust Adapter Support filed on May 18, 2018.

BACKGROUND OF THE INVENTION

1. Field of the Invention

The invention relates to High Capacity Battery Charger with Robust Adapter Support.

2. The Prior Art

Previously, portable battery chargers for field use or military deployment have been limited by the number of available ports or channels, power throughput and efficiency, restrictions on input power and the amount of information provided on adapter and battery status. In addition, previous chargers were large, heavy and suffered from slow charge times.

Many devices, like portable tools, have removable batteries that attach to dedicated chargers that are provided with the tool. For example, U.S. Pat. No. 8,018,198 entitled Method and System for Charging Multi-Cell Lithium-Based Batteries has a dedicated charger that can control the charging current and shut off in the event of an overheat condition. U.S. Pat. No. 8,633,824 entitled Charger provides a dedicated charger with LED indicators that notify the user of various conditions during charging. U.S. Pat. No. 8,786,254 entitled Battery Charger provides a dedicated charger with a sloped top surface and grooves to channel water away from the electrical contacts. U.S. Pat. No. 9,166,417 entitled Charger provides a dedicated charger with two power supplies and four charging ports. Separate indicators for each port advise which battery will be charged first. U.S. Pat. No. 9,634,503 entitled Battery Charger provides a dedicated charger with two battery charging ports and a separate DC port, for example a USB connector for a cellular phone.

In certain field operations or military applications, there is a need to charge a wide variety of different batteries. For versatility the charger needs to be powered from various AC or DC sources such as AC mains power, solar panels, other batteries like vehicle batteries. It would be desirable to provide a high capacity battery charger with 800 W to 1200 W of charging power delivered to multiple ports, with each port supporting two or more channels. The ports require a large number of contacts to provide charging power and communications with multiple smart batteries. The charger also requires charging protocols to prioritize charging and manage charging with soft DC sources to account for solar panel power output fluctuations and to avoid draining vehicle batteries. The proposed charger is a sophisticated piece of equipment that needs a protective housing for transport and environmental protection. In order to accommodate the wide variety of batteries with a single charge, multiple adapters are needed to plug into the ports. It would be desirable to provide a multi-slot Jones Connector as the port access point.

Multi-slot connectors, for example Jones Connectors or Cinch Jones Connectors have been in use for many years. U.S. Pat. No. 1,841,736 entitled Connector for Electrical Lines discloses a multi-slot connector body without any features for panel mounting. U.S. Pat. No. 2,420,754 entitled Terminal Panel discloses a multi-contact panel construction with wiring lugs forming the contacts. U.S. Pat. No. 2,430,011 entitled Plug Ejector provides a scissor ejector to remove the plug in an axial direction without bending the contacts. U.S. Pat. No. 2,525,210 entitled Socket Contact discloses a multi-slot socket to receive a pronged electronic tube.

It would be desirable to provide a multi-slot Jones-type Connector for use in a battery charger in conjunction with an adapter latch. A suitable Jones-type connector would provide a connector body integrally molded with a flange for environmental protection and mounting posts for secure connections.

SUMMARY OF THE INVENTION

It is one object of the present invention to provide a four port, eight channel portable charger with at least 800 Watt charging capacity, for example, 1,000 Watt charging capacity at about 90 percent system efficiency.

These and other related objects are achieved by providing robust adapter support with the following features, utilized separately or in any combination.

The port female connector design reduces potential damage to adapter male contacts.

The port female connector provides a better water tight connection to the top support deck.

A pivoting adapter latch provides a secure connection for the adapter and easier adapter dismounting.

Fan cycling has been incorporated to address low power modes of operation.

An extension to the EMI Shield allows greater cooling capacity.

A discharge adapter allows discharging, and smart battery reconditioning and resetting.

A further adapter allows multiple configurations for large battery recharging.

Nesting racks that fit within a case are provided to store adapters when not in use.

These and other related objects are achieved in a first embodiment by a high capacity battery charger having multiple sockets adapted to connect to a plurality of different battery-receiving adapters. Each socket includes a multi-slot female Jones-type connector body and a planar flange integrally molded with said connector body, extending outwardly from said connector body and completely surrounding said connector body. The multi-slot female Jones-type connector body is adapted to receive blades from the battery-receiving adapter in an axial direction. The planar flange is oriented perpendicular to the axial direction.

Two inverted V-shaped folded electrical contact ribbons are disposed in each slot of said multi-slot Jones-type connector body. The contact ribbons are compressed against each other and the side walls of the slot. Two side walls of the slot include two protruding chamfers opposite from each other that extend over the peaks of the inverted Vs of the ribbons, and the other two side walls of the slot include two recessed chamfers oriented 90 degrees from the protruding chamfers. A first group of slots include protruding chamfers aligned in a first direction, and a second group of the slots include protruding chamfers aligned along a second direction perpendicular to the first direction, wherein the perpendicularly oriented protruding chamfers are adapted to guide blades into the axial direction.

The multi-slot female Jones-type connector body has a top across which the slots are open and arranged in rows and a spaced opposite bottom. The planar flange surrounds said connector body between the top and bottom. The planar flange has an upper surface that is spaced from the top of said connector body by a first offset distance and an opposed lower surface facing in the same direction as said connector body bottom. Each socket includes two sets of mounting posts integrally molded with the multi-slot female Jones-type connector body and the planar flange. Two sets of mounting posts extend from the lower surface of the planar flange and terminate at the connector body bottom. The first set of posts is disposed adjacent the connector body, i.e. the connector body is tangent to the external cylindrical surface of the post. The first set of posts receives screws to secure a wiring harness coupling to the bottom of the connector body. A strip of double-sided tape is applied to the bottom of the connector body to adhere to the wiring harness coupling and form a flexible, water-tight seal. The second set of posts is adapted to receive screws to secure the upper surface of said planar flange to the underside of a battery charger support deck. For example, sheet metal screws pass through a bore in the charger support deck and thread into the second set of posts, with the screw head countersunk, and flush with the support deck. The second set of posts includes one or more posts disposed adjacent the connector body, and two or more posts individually disposed adjacent two or more posts of said first set of posts.

A flat gasket is disposed on the upper surface of said planar flange and adapted to be compressed against the underside of a battery charger support deck. The planar flange includes a recessed well disposed laterally adjacent one side of the connector body and a well wall that originates at the connector body, surrounds three sides of the recessed well, and terminates at the connector body on the opposite side of the recessed well. The well wall has an upper surface that is spaced from the top of the connector body by a second offset distance that is less than the first offset distance. The well wall extends upwardly from the upper surface of the planar flange a distance the same as the thickness of the battery charger support deck. The upper surface of the planar flange includes a groove running continuously around said connector body and said well wall adapted to receive a gasket. The flat gasket forms a closed loop and is disposed with the connector body and the well wall interior of the closed loop and the second set of posts exterior of the closed loop. The top of the multi-slot female Jones-type connector sits above the battery charger support deck by a distance equal to the first offset minus the second offset to prevent pooling water on the battery charger support deck from flowing into the slots.

These and other related objects are achieved in a second embodiment by a high capacity battery charger including a multi-slot female Jones-type connector body having an upper surface and a latch well integrally molded with said connector body and having a floor positioned below the upper surface. The different battery-receiving adapters and control electronics communicating with the adapters through the Jones-type connector body. A pivoting latch is provided to plug and unplug the battery-receiving adapters from the Jones-type connector body. The pivoting latch includes a latch foot disposed within the latch well in the plugged state. The latch foot includes a top end that is below the level of the upper surface in the plugged state. The latch foot includes a layer of compressible material disposed on the top end.

The latch includes a latch arm which supports a latch finger in parallel spaced relationship to the latch foot. The distance between the latch finger and the latch foot is slightly greater than the height of the battery-receiving adapters. The distance between the compressible material in the uncompressed state and the latch finger is less than the height of the battery-receiving adapters whereby the battery-receiving adapter compresses the compressible material during pivoting of the latch and in the plugged state. The latch pivots about an axis that is positioned below said latch well floor so that the latch finger presses the adapter toward the Jones-type connector body to plug, and the latch foot presses the adapter away from the Jones-type connector to unplug.

The control electronics includes a supervisory controller and a charge control regulator. The Jones-type connector body includes low voltage contact slots and high voltage contact slots. The charge control regulator communicates data between said supervisory controller and said adapters through the low voltage contact slots. The charge control regulator includes two ports. Each port comprises one Jones-type connector body and one adapter. One of the adapters is a two or more channel adapter in which each channel is configured to charge a different type of battery.

The control electronics includes two 400 W to 600 W power supply rectifiers coupled through a power management module to two of the charge control regulators, respectively. The power management module provides filtered DC power to the two charge control regulators. The supervisory controller provides a power saving charging protocol upon sensing a connected [soft] DC power source like a solar panel or vehicle battery, whereby power is proportionally reduced to all active channels so that the total output charging power level is below the power provided by the connected input DC power source.

One adapter is a three channel adapter and includes a display of battery charge status on each of the channels. Each channel provides a selectable charging protocol based on the battery type. Some adapters are configured to charge a smart battery. Battery data is communicated between the adapter and said supervisory controller using an SM Bus communications protocol, a DQ communications protocol or an HDQ communications protocol.

A variety of charging cables are provided to couple a remotely positioned [large format] battery to one or more of the charge control regulators, to save space on the charger support deck. A discharge adapter is provided for discharging a coupled battery to a user selectable level. The discharge adapter includes a multi-slot female Jones-type connector for coupling to one of the battery-receiving adapters for charging a coupled battery. In this manner, a battery charging adapter can be piggy-backed onto a discharge adapter. Accordingly, the presence of a discharge adapter does not take one of the ports out of battery charging service.

A back stop is positionable at two spaced locations from said pivoting latch to hold the far end of two differently sized adapters in place so avoid sliding away while the latch pivots said adapters between the plugged and unplugged states.

The adapters are configured for storage within stackable racks that include a frame to surround and extend beyond the male contact blades of the adapters and prevent damage to said male contact blades during stacking. A planar flange is integrally molded with the connector body and the latch well. The planar flange extends outwardly from said connector body and latch well and completely surrounds said connector body and latch well. A variety of D.C. power charging cables are provided for each type of D.C. power source and include a different resistance between cable conductors. The supervisory controller senses the resistance of the particular charging cable to select a power draw limiting protocol. The selection of a power draw limiting protocol is based on one of, or a combination of, temperature, the type of D.C. source, and the amount of power being drawn.

These and other related objects are achieved in a third embodiment of a high capacity battery charger including a chassis having cooling apertures disposed within a housing. A power supply is mounted within the chassis. An electromagnetic interference shield having a top and two sides extends in a longitudinal direction to cover the power supply. The electromagnetic interference shield has two open ends. A cooling fan is aligned between the cooling aperture and one of the open ends. A wing extends from the top of the electromagnetic interference shield in the longitudinal direction toward the cooling fan to direct air underneath said electromagnetic shield across the power supply. The two sides extend down from the top in a parallel spaced configuration. The top and two sides have an inverted U-shaped cross-section. The electromagnetic interference shield includes a flange at the bottom of at least one of the sides for mounting to the chassis. The electromagnetic interference shield is devoid of sides below the wing. The cooling fan has a central axis, and the wing is aligned with the central axis of the cooling fan.

The chassis has a front side and a back side. The cooling aperture is in the front side, and a second cooling aperture is in the back side. The second cooling fan is aligned between the second cooling aperture and the other open end. Along the longitudinal direction from front to back along the chassis there is positioned the front side aperture, the front cooling fan, the electromagnetic shield, the back cooling fan and the back side aperture. A third cooling aperture is provided in the front side and a fourth cooling aperture is provided in the back side. A second power supply and a second electromagnetic interference shield having a second wing and a third open end and a fourth open end are mounted in the chassis laterally adjacent the first power supply and the first electromagnetic interference shield. A third cooling fan is aligned between the third aperture and the third open end and a fourth cooling fan is aligned with the fourth aperture and the fourth open end. The power supplies comprise rectifiers which are idle when the charger is receiving D.C. input power, wherein one front side cooling fan and one back side cooling fan are idle when the charger is receiving D.C. input power. The cooling fan in the front side and the fourth cooling fan in the back side operate at the same time on one diagonal D.C. input power cooling mode alternating with the second cooling fan in the back side and the third cooling fan in the front side operating at the same time in a second diagonal D.C. input power cooling mode.

The cooling fans on one side of the chassis draw air into the chassis, and wherein the cooling fans on the back side of the chassis expel air out of the chassis. The apparatus includes a fifth cooling aperture and a fifth cooling fan aligned with the fifth cooling aperture which runs constantly when the battery charger is operating. The five cooling fans operate in different modes based on a sensed internal temperature. The power supply and said second power supply are each 400 W to 600 W power supplies, for example two 500 W power supplies. The four cooling fans operate in different modes based on the wattage level within the charger.

The housing includes a lower portion and an upper portion that is hinged to the lower portion for opening and closing in a clamshell configuration. The upper portion is removable from the hinge by removing the hinge pin. The chassis is removably mounted to the lower portion of the housing. The lower portion includes four side walls that extend upwardly to partially enclose the bottom of said chassis, and wherein said four side walls terminate below the cooling apertures. The four side walls are a front side wall that extend upwardly to a height H; a rear side wall that extends upwardly to a height L that is less than H; a left and right side walls with a contour that dips from height H to L so that water collecting on the front side wall runs along the left and right side down along the contour dips and draining over the rear side wall outside of the housing.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

The battery charger can receive a wide variety of AC and DC input power sources. AC source power is directed through two power supplies that provide DC output. A low power AC source may use one power supply, while both power supplies would be operational at higher power levels. The power supplies function as AC to DC converters, also known as rectifiers. Two power supplies are provided each with 400 W to 600 W of power, for example two 500 W power supplies. A power management module controls operation of the power supplies. The DC output of the power supplies is directed to the power management module for DC filtering. DC source power is also directed to the power management module. The power management module communicates incoming power profiles to the supervisory controller that executes pre-programmed charging protocols, as customized by the user. The charger exceeds an 85% system efficiency when operating using AC input power. The charger exceeds a 90% system efficiency when operating using DC input power.

Figure 9:
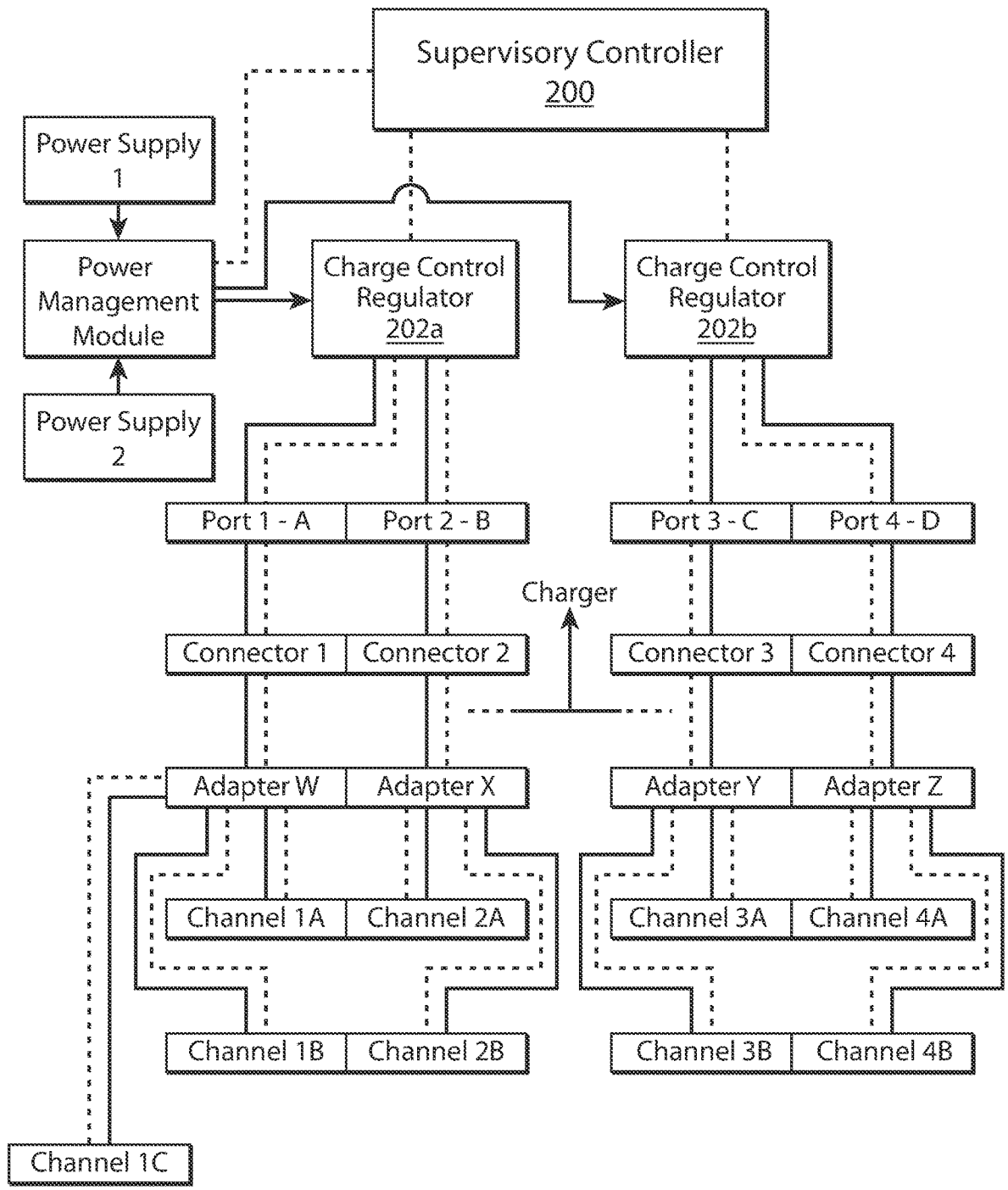
FIG. 9 is a schematic diagram of the electronic components within the battery charger.

The filtered DC output of the power management module is directed to a pair of charge control regulators 202a and 202b, as shown in FIG. 9. A low power source may dictate use of one regulator, while both regulators would be operational at higher power source levels. The regulators communicate adapter and battery information to the supervisory controller, and the supervisory controller communicates charging protocols to the regulators. Low voltage communications data is illustrated in dotted lines, while high voltage charging power is shown in solid line.

The battery charger deck includes four ports, or adapter bays, adjacent the user interface. One regulator provides charge and control data to ports A and B, while the other regulator provides charge and control data to ports C and D. Each port includes a 25-30 slot Jones-type Connector, for example a 27 slot female connector with slots set in 3 rows at different angles to receive the 27 pin male connector in one orientation only. Each port includes two channels. Accordingly, each regulator provides charge and control data to four channels via 2 ports. The regulators are capable of providing at least 800 Watts of charging power, and in one embodiment, the regulators with adequate input power can provide 1,000 watts of charging power. Each regulator can distribute 400-500 Watts of charging power independently over its corresponding four channels.

The ports comprise generic power and data connections. The ports cannot directly charge batteries, instead a variety of adapters are provided. The adapters shown in FIG. 3C are configured with different sockets to receive about 20 types of rechargeable batteries. The charger provides robust adapter support including support for legacy adapters to allow one charger according to the invention to charge over 60 different battery types. One aspect involves equipping the ports with a positive mechanical connection for the adapters. Another aspect is heat management to compensate for throughput and efficiency requirements that are needed for high capacity charging on all four ports, and up to eight channels simultaneously. A further aspect is support for special adapters, that is adapters which differ from single port, single channel battery charging.

In order to initiate charging, an adapter must be coupled to one of the ports. This coupling comprises the 27 pin male connector on the bottom of the adapter to plug into the 27 pin female connector on the port. The adapter must then be positively secured to meet vibration and 15 degree system employment angle standards.

Figure 1A:
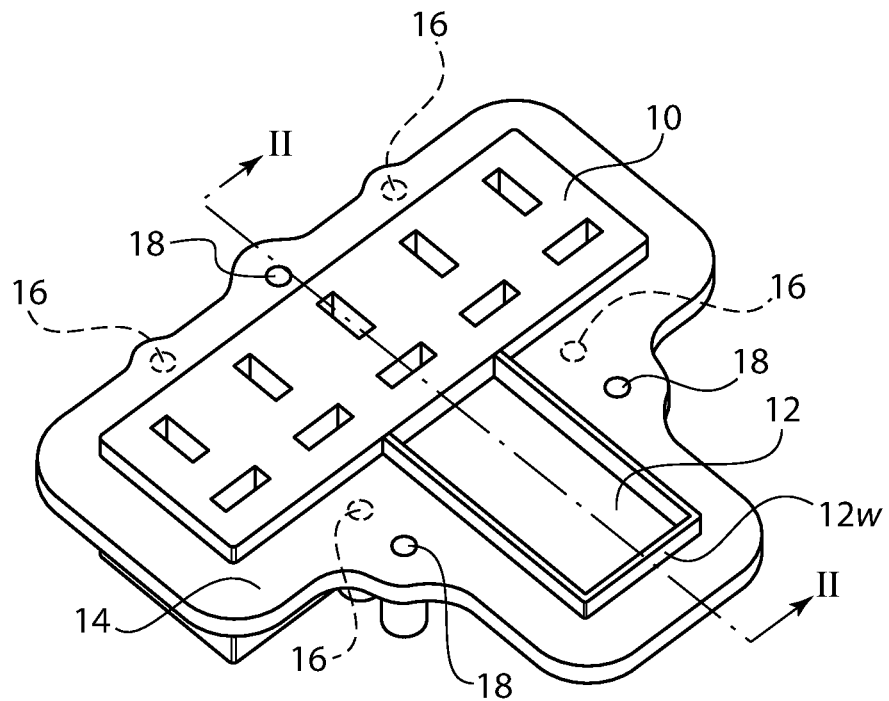
FIGS. 1A, 1B and 1C are perspective views of an embodiment of a female connector housing, latch well and mounting flange according to the invention.
Figure 1B:
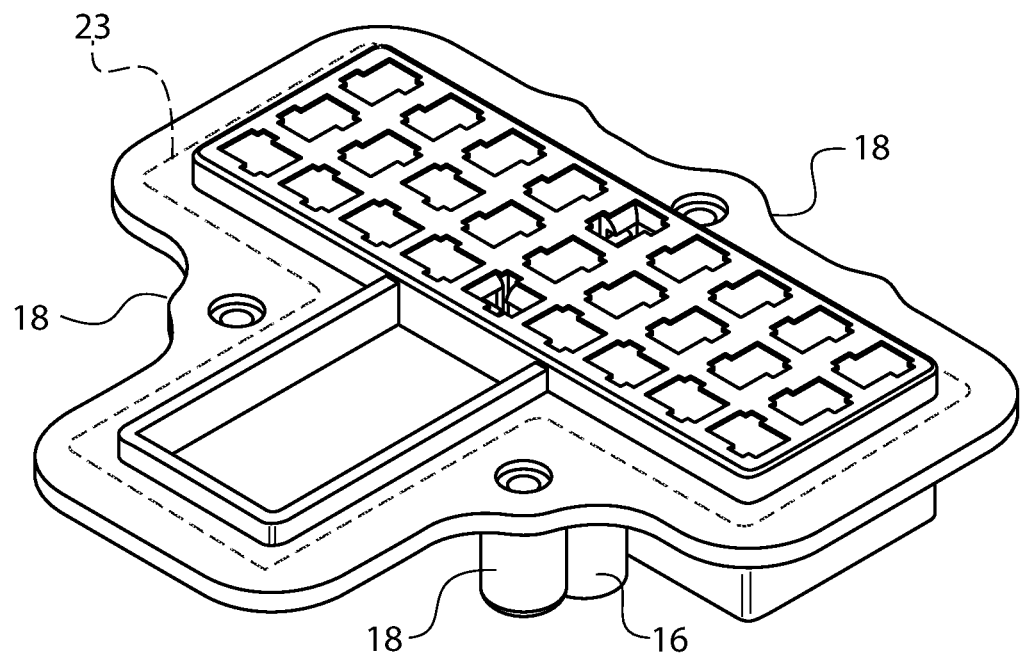
Figure 1C:
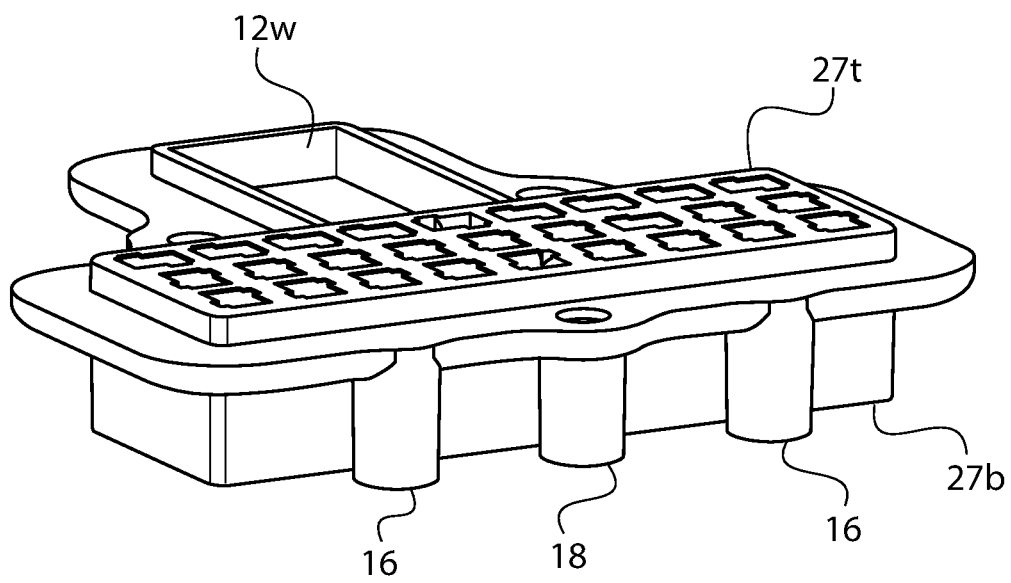
Figure 1D:
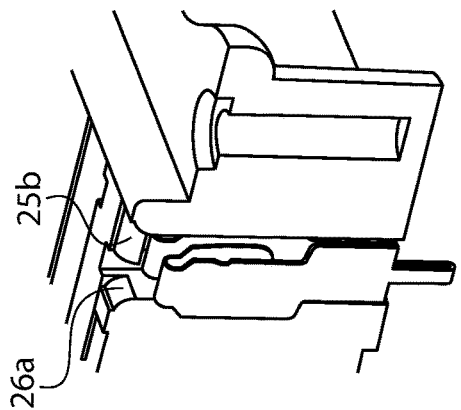
FIGS. 1D, 1E, 1F, 1G and 1H are various enlarged cross sectional views of a slot and contact ribbon of the female connector.
Figure 1E:
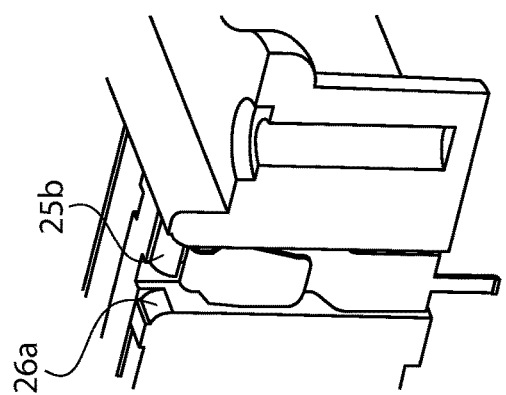

Typical Jones-type Connectors have female sockets where the rectangular openings have right angle corners for part of the opening and radius edges for other parts of the opening. In field use, or in military operations, the male contacts can be bent. The right angle/radius edge openings allowed the male contacts to partially plug while the adapter was mis-aligned. A slightly bent male contact could become further bent, when the adapter is forcefully plugged off of the central, preferred 0 degree entry axis. The angular forces on the female socket could damage the socket support, effect the electrical connection to the lower side of the female socket or compromise the water-proof connection between the female socket and the top support deck of the charger. In this application Jones-type connector body means a multi-slot socket having two or more rows of slots with some slots arranged perpendicular to other slots. A Jones-type connector may also be referred to as a Jones connector or Cinch-Jones connector. For example, FIG. 1A shows a top row of slots aligned vertically and parallel to one another, and a bottom row with the slots aligned horizontally. An additional row of slot may be included on an appropriately larger sized socket above, below or in the middle of the two rows shown. The additional row may include vertical slots, horizontal slots, or a combination of both. The combination of vertical and horizontal slots in a non-symmetrical arrangement assures that the plug can only be inserted in one orientation. In a practical embodiment, the Jones-type connector of the invention includes three rows of nine slots for a total of 27 slots as shown in FIGS. 1B and 1C. The slots may be oriented in any combination of vertical slots and horizontal slots. While the slots and internal contacts are similar to each other, some slots are designated for high power battery charging circuits and some slots are designated for low power control circuits. The slots are open at the top of the female Jones-type connector body.

Figure 1H:
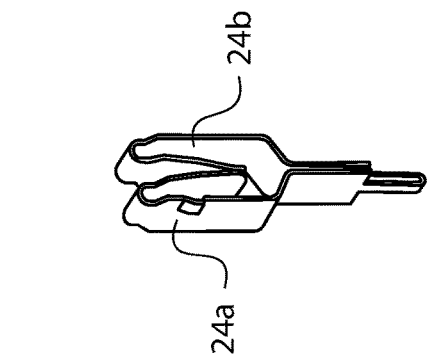
Figures 1F, 1G:
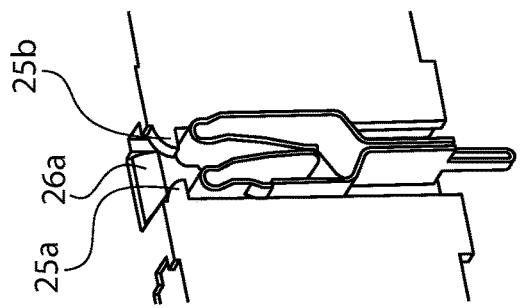

To address these problems, a female socket connector body has been provided with a chamfered edge extending continuously around each of the 27 rectangular contact slots. When the differently angled male contacts engage the chamfered edges, they are guided into alignment, so that the adapter is progressively rotated toward the preferred 0 degree entry axis. As can be seen in FIGS. 1A, 1B, 1C and 2, extending laterally off the center of the female socket connector body 10 is a rectangular latch well 12. The female connector body and the latch well are arranged in a T shape. The latch well receives the latch foot when the latch is in the adapter locking position. For the sake of clarity the connector is shown with 10 exemplary contact slots. In practical embodiments 27 contact slots are provided. In the cross-sectional view of FIG. 2, the molded sides of the contact slot openings comprise the chamfers, which provides a smooth transition to guide the male pins, and properly angle the adapter for plugging. FIGS. 1D-1G show enlarged cross-sectional views of a slot including two inverted V-shaped folded electrical contact ribbons 24a,b shown in FIG. 1H. The contact ribbons are disposed in each slot and are compressed against each other and the side walls of the slot. The connector body is molded to form two protruding chamfers 25a,b opposite from each other that extend over the peaks of the inverted Vs of the ribbons. The connector body is also molded to form two recessed chamfers 26a,b oriented 90 degrees from the protruding chamfers. The four side walls of the slot are molded with alternating recessed chamfers and protruding chamfers that cover the top of the ribbon contacts. The respective location of the recessed chamfers with respect to the protruding chamfers changes as the slots vary from vertical to horizontal orientations.

Surrounding the connector body and latch well is an outwardly extending flange 14. Threaded posts are formed underneath the flange. One set of posts 16 has their threads open toward the bottom, to receive screws to secure a cable connector to the socket contacts. Double-sided tape 29 is applied to the bottom of said connector body to adhere and seal to the wiring harness coupling. Another set of posts 18 have their threads open toward the top, through the flange, to receive screws to secure the female socket to the underside, lower surface 22a of the top support deck 22. In FIGS. 1B and 1C, one set of posts 16 is disposed adjacent the connector body. In FIG. 1B two or more posts 18 are disposed adjacent the first set of posts 16. On either side of the latch well, posts 16 are disposed between posts 18 and the connector body. The adjacent posts 16, 18 are stacked along a line parallel to the side of the latch well. The upper surface of the flange has a shallow channel or groove 20 around its periphery to receive an O-ring or gasket (not shown) that is sealed to the lower surface 22a of the top support deck 22. In a practical embodiment, a flat gasket configured in a closed loop is set on the flange without a groove along the dotted line 23 as shown in FIG. 1B. The flange is set lower than the socket by a first offset distance 28a, so that the socket sits raised above the top support deck. In other words, the flange is set lower than the thickness of the top support deck. As a result, water accumulating on the top support deck cannot run directly into the sockets. The wall 12w surrounding the latch well 12 is shorter than the socket connector body 10 and dimensioned to sit flush with the top support deck 22. The latch wall 12w originates at the connector body, surrounds three rectilinear sides of the latch well, and terminates at the connector body on the opposite side of the latch well. The well wall 12w has an upper surface that is spaced from the top of the connector body by a second offset distance 28b, that is less than the first offset distance 28a. The well wall 12w extends upwardly from the upper surface of the planar flange a distance equal to the thickness of the battery charger support deck 22 to lie flush therewith. The top of the connector body is sits above the battery charger support deck 22 by a distance equal to the first offset distance 28a minus the second offset distance 28b. The O-ring or gasket further prevents the water from leaking between the housing and the top support deck into the charger. The connector body, latch well, flange and posts are integrally over-molded around the contacts 30 from a high strength material, for example a thermoset polymer or nylon. The integrally formed posts replace separate metal mounting brackets that are typically supplied with Jones Connectors.

The connector body has a top 27t and a bottom 27b. The planar flange 14 surrounds the connector body 10 between the top and bottom. The planar flange 14 has an upper surface that is spaced from the top of the connector body by a first offset distance 28a.

Figure 3B:
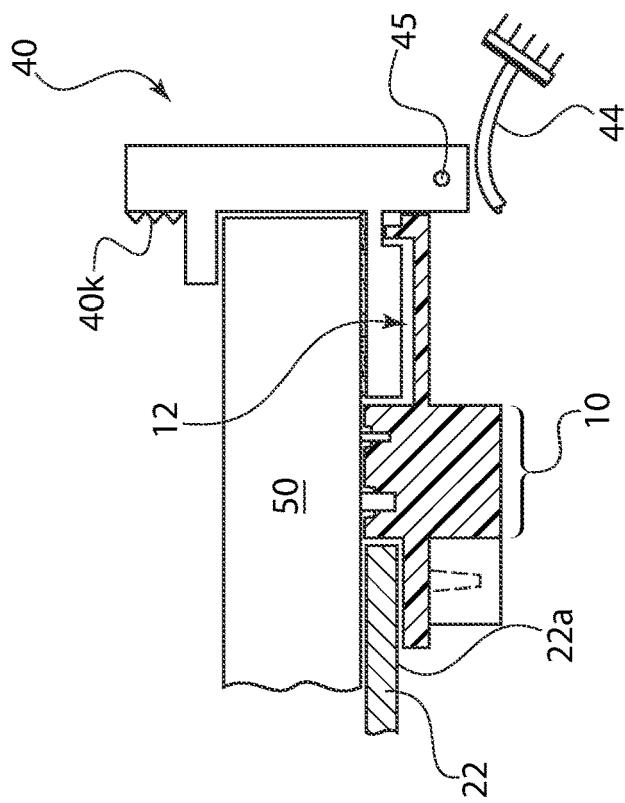
FIG. 3B is a side elevational view of an embodiment of an adapter latch securely mounting an adapter to the charger with the female connector housing shown in cross-section.
Figure 3A:
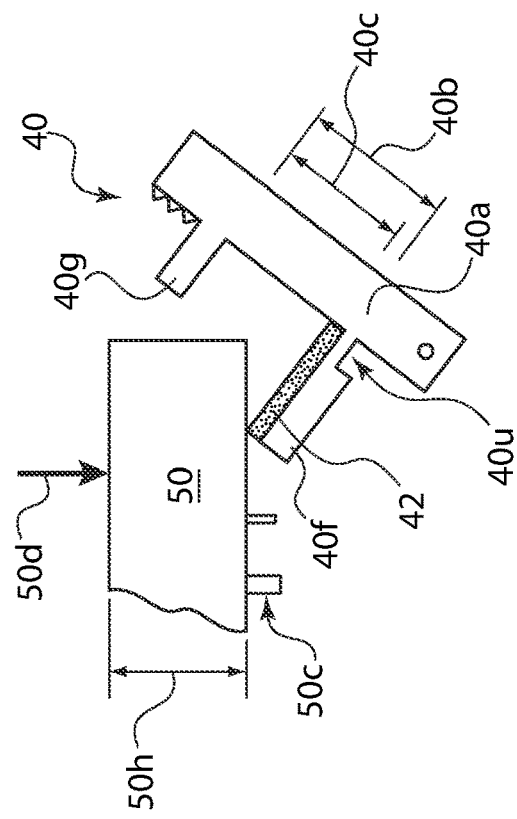
FIG. 3A is a side elevational view of an embodiment of an adapter latch in the initial stage of latching an adapter to the charger.
Figure 3C:
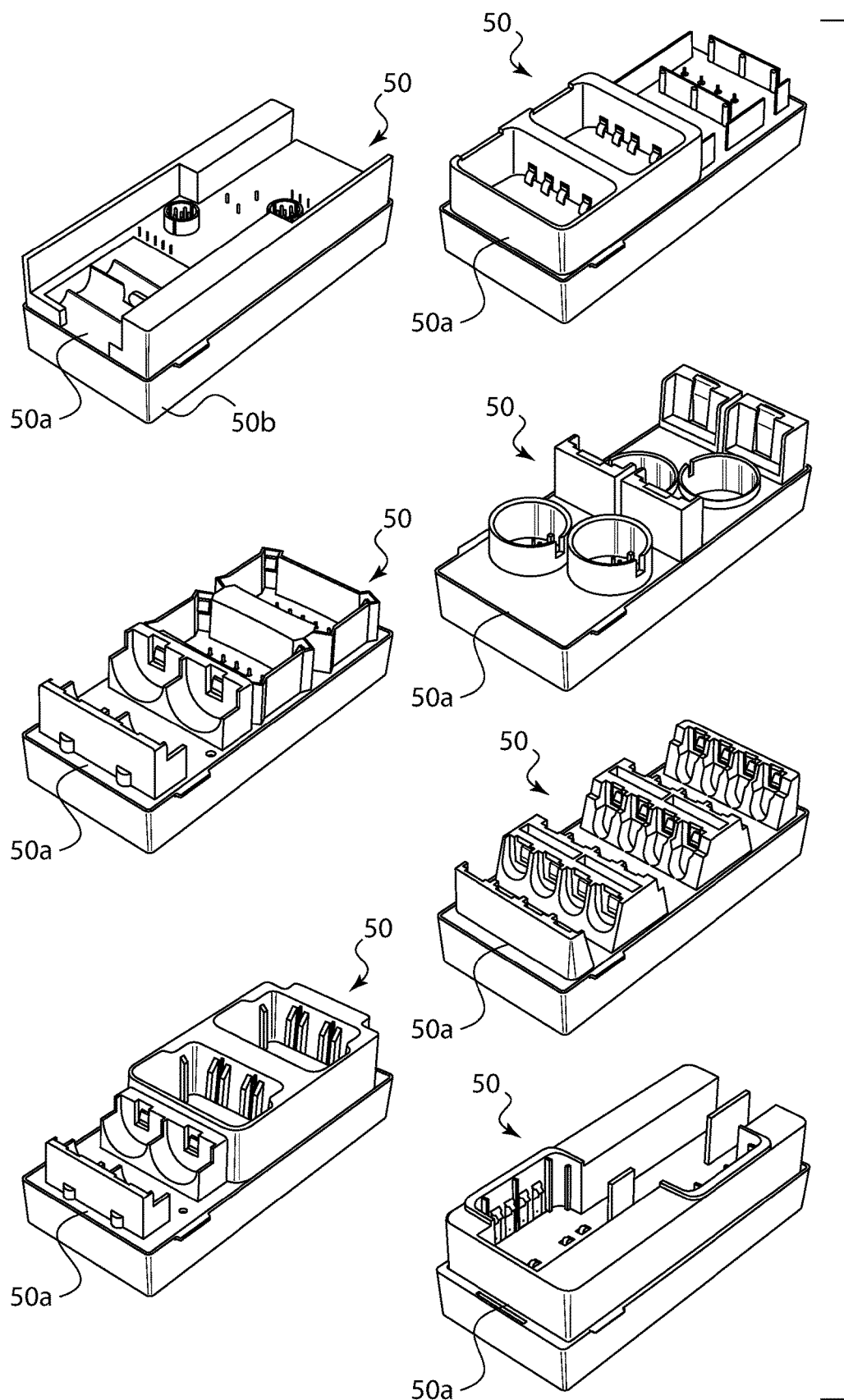
FIG. 3C is a table listing various types of adapters.

As can be seen in FIGS. 3A and 3B, a latch 40 is pivotally mounted 45 just below the latch well for locking any one of the adapters 50 in place. A variety of adapters are provided to receive different types of batteries. The adapters include a corresponding number of vertically and horizontally oriented blade contacts with plug into the multi-slot female Jones-type connector in one orientation only, referred to as polarity matching. Latch 40 includes an upper latch finger 40g, a vertically extending latch arm 40a and a latch foot 40f. The C shaped gap between upper latch finger 40g and latch foot 40f is slightly larger than the height 50h of adapter 50. The gap has a height 40b. A layer of compressible padding 42 is disposed on latch foot 40f to reduce the gap height to 40c. The padding may be formed from a medium or high density foam, for example, a medium density closed cell foam. As an illustrative example, assume the adapter height 50 is 1 inch. If the gap height 40b was slightly larger than 1 inch, the adapter could not fit into the gap when the latch is tilted. The adapter could only fit if it was directly aligned with the gap and slid into the gap toward the latch arm 40a. Since the adapter must enter the gap with the latch at an angle as shown in FIG. 3A, the gap must be larger than 1 inch. The gap height 40b is accordingly set at 1.1 inches. However, when the latch is locked, as shown in FIG. 3B, the adapter would have 0.1 inches of clearance, and could move upward. It should be noted that adapter 50 must be installed in a downward direction 50d so that its 27 male contacts 50c can engage the female socket connector body 10. The latch foot includes a top end that is below the level of the upper surface of the connector body in the plugged state.

To address this problem, a 0.2 inch thick compressible foam 42 is disposed over the latch foot 40f, to provide a reduced gap height 40c of 0.9 inches. Installation of adaptor consists of a two step process. In step one of FIG. 3A the adapter is pressed in downward direction 50d to compress the foam and increase the size of the opening to greater than 1 inch, up to slightly less than 1.1 inches, i.e. gap height 40b. In step two, the latch is pivoted counter-clockwise to the position shown in FIG. 3B, thereby plugging the adapter's male contacts 50c in to the female socket connector body 10. The foam expands and snugs the adapter against latch finger 40g. An undercut 40u is provided on the lower surface of latch foot 40f. As can be seen in FIG. 3B, latch foot 40f is seated within latch well 12, with undercut 40u straddling the right wall of latch well 12. To positively hold the latch in a locked position, a leaf spring or equivalent device is installed, which snaps against the bottom flat surface of the latch when it is in the locked position.

The top of latch arm 40 includes a knurled surface 40k. To remove the adapter, knurled surface 40k is pressed to the right, to pivot the latch in the clockwise direction, against the biasing force of leaf spring 44. The foam is compressed to provide additional clearance within the gap. As latch finger 40g clears the top corner of adapter 50, latch foot 40f pries the adapter upward, in the opposite direction of 50d, to unplug male contacts 50c from female socket connector body 10.

Figures 7, 8:
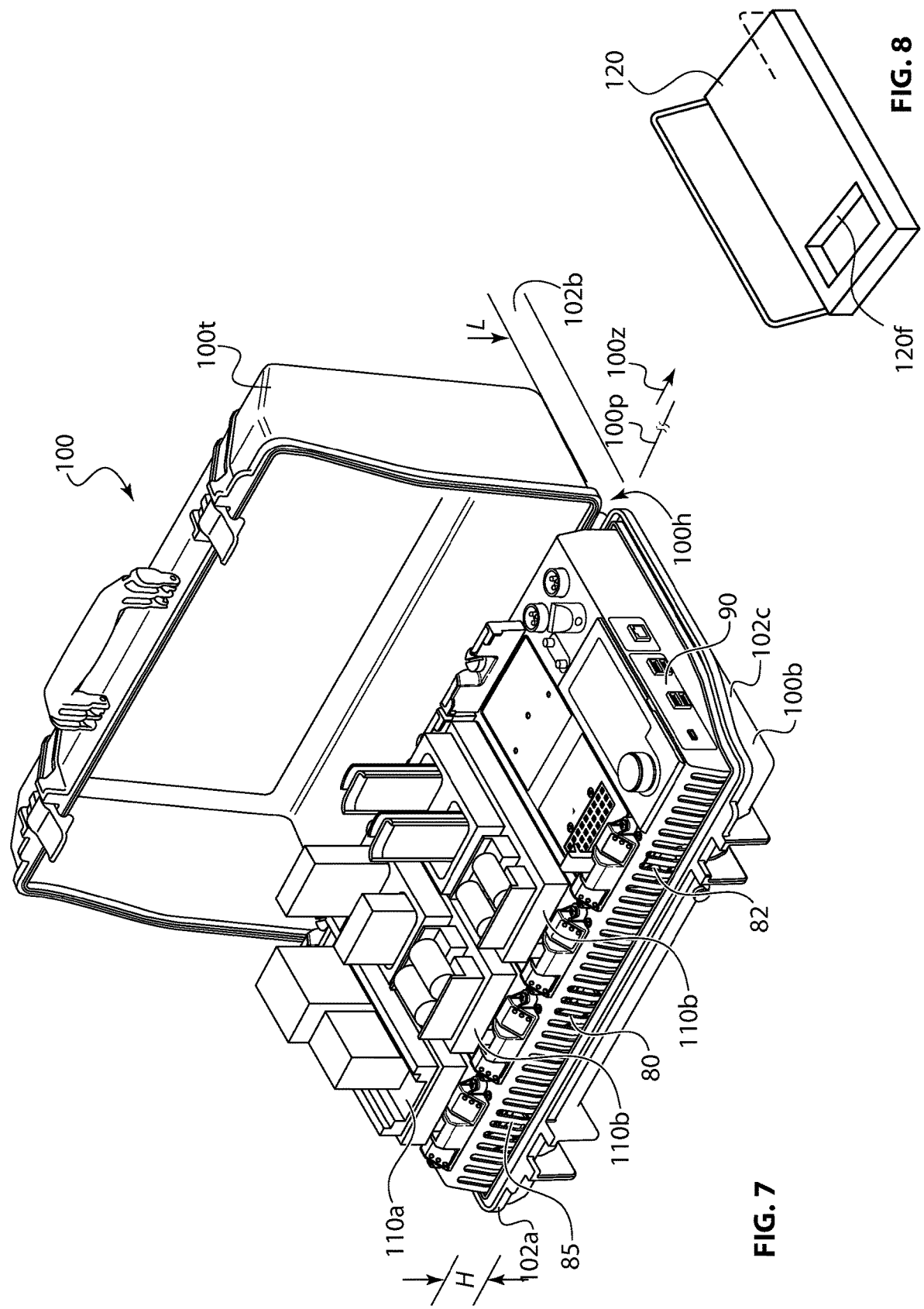
FIG. 7 is a perspective view of an embodiment of a battery charger chassis within a housing with three adapters installed.
FIG. 8 is a perspective view of an adapter rack.

An exemplary group of adapters is shown in FIG. 3C. The front side of each adapter includes a ledge 50a that is captured within the latch arm during plug in. On the bottom, towards the front of each adapter is a multi-blade male Jones-type connector, for example a 27 blade male connector, that plugs into the multi-slot female Jones-type connector on the battery charger. FIG. 7 shows three adapters of two different types installed on the charger.

Figure 4A:
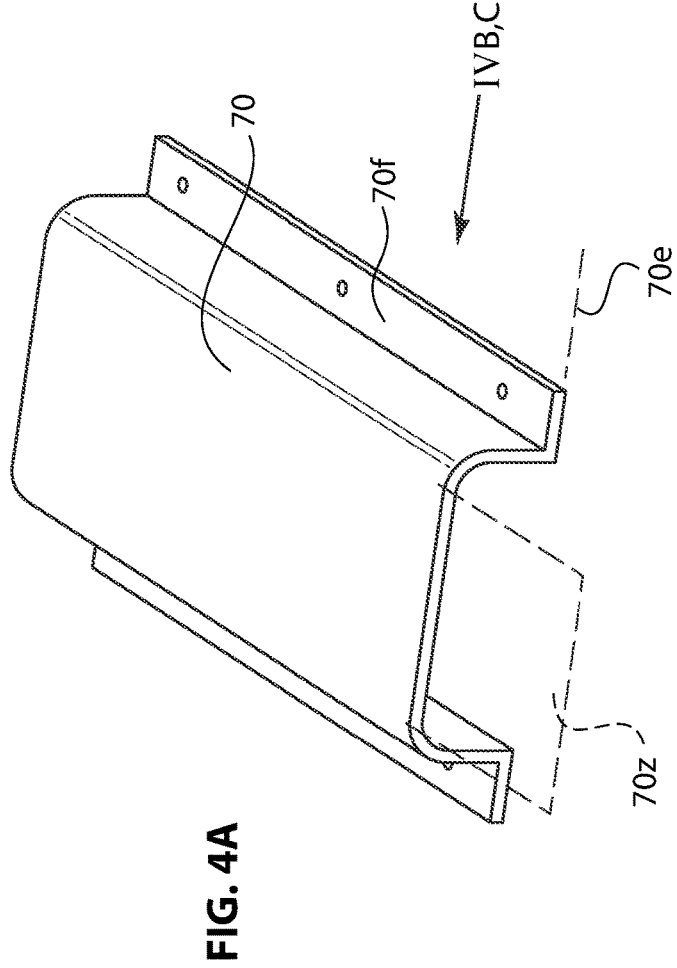
FIG. 4A is a perspective view of a prior art EMI shield with the inventive wing shown in dotted line.

In order to adequately support a high power throughput to the adapters for battery charging, a heat management system is required. Heat management in the high capacity battery charger is challenging when the charger is configured for military deployment because the power supply and certain electronics, like printed circuit boards (PCB), require electromagnetic interference (EMI) shielding. The EMI shield is typically a metal plate that covers the susceptible components. FIG. 4A shows one embodiment of an EMI shield 70 which generally has a U-shaped cross section, with outwardly extending flanges 70f. The flanges include apertures used to screw the shield to the charger frame. EMI shield 70 is made by bending a flat sheet metal plate into the U shape with flanges, i.e. by forming 4 bends. Cooling air needs to be directed underneath the shield 70 in order to pass by the susceptible components.

Figure 4C:
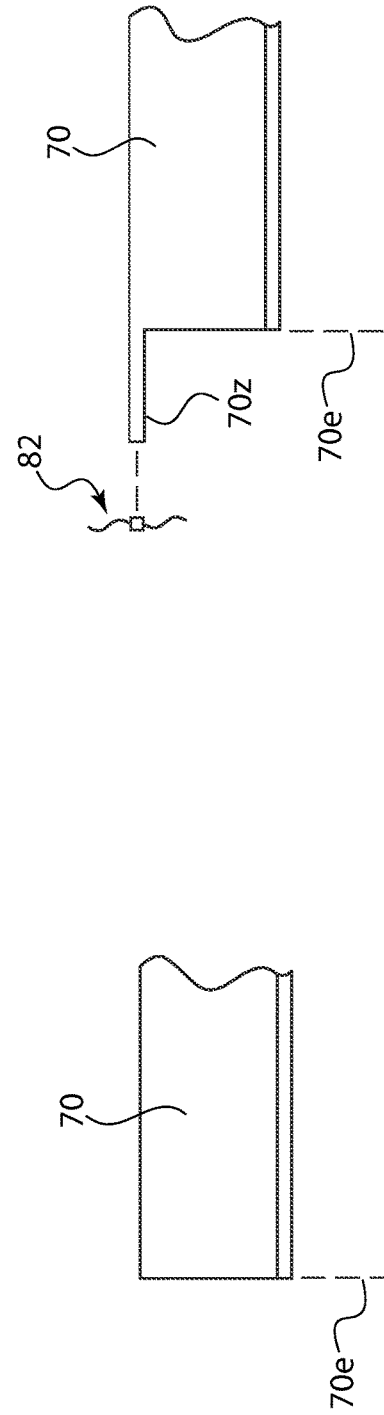
FIGS. 4B and 4C are partial side elevational views taken from arrow IVB,C in FIG. 4A
Figure 4B:
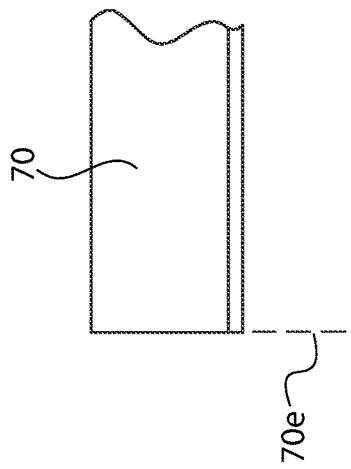

In certain environmental conditions, or when the charger is operating in low power mode, sufficient air flow was not achieved underneath the shield, and the charger could shut down due to an overheat condition. Lengthening the shield toward the fan adds weight to the charger and further encloses the power supply, creating a longer path for cooling air. To address this problem, an airflow capture wing 70z was added to extend the top panel of shield 70 in the direction of the fan. FIGS. 4A, 4B and 4C show the leading edge 70z of the prior art shield 70. FIG. 4A shows the proposed airflow capture wing 70z in dotted line. FIG. 4C shows the airflow capture wing 70z extending to the left beyond leading edge 70e. The new shield is made by stamping out a metal plate to a rectangle with integral wing. Four bends are then formed in the plate to create the U shape and flanges. The shield is devoid of sides below the wing.

Figure 5:
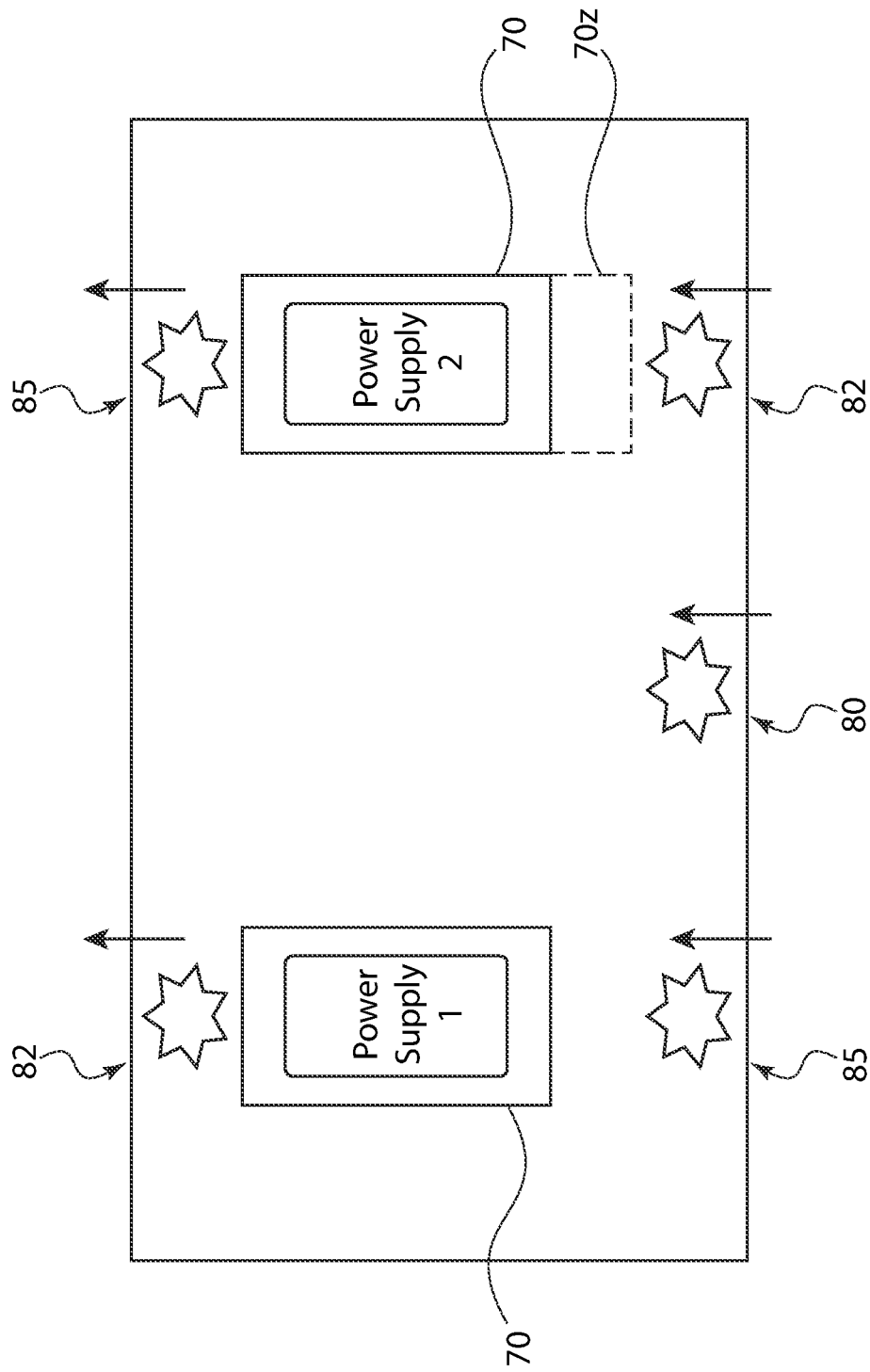
FIG. 5 is a diagram showing placement of fans and the EMI shield within the charger's removable chassis.

The bottom of the chassis of the charger is shown in FIG. 5, with fans 80, 82 and 85. A prior art shield 70 is shown on the left side of the chassis covering the left power supply. The newly designed shield 70 is shown on the right side, with airflow capture wing 70z extending toward the bottom of the page closer to the bottom right fan 82. The wing 70z is aligned generally with the central axis of the fan. Approximately 50 percent of the cooling air is captured below the wing and directed underneath the shield. The fans are frame mounted on front and rear walls of the chassis, where apertures are formed within the walls aligned with the fan blades.

Figure 6:
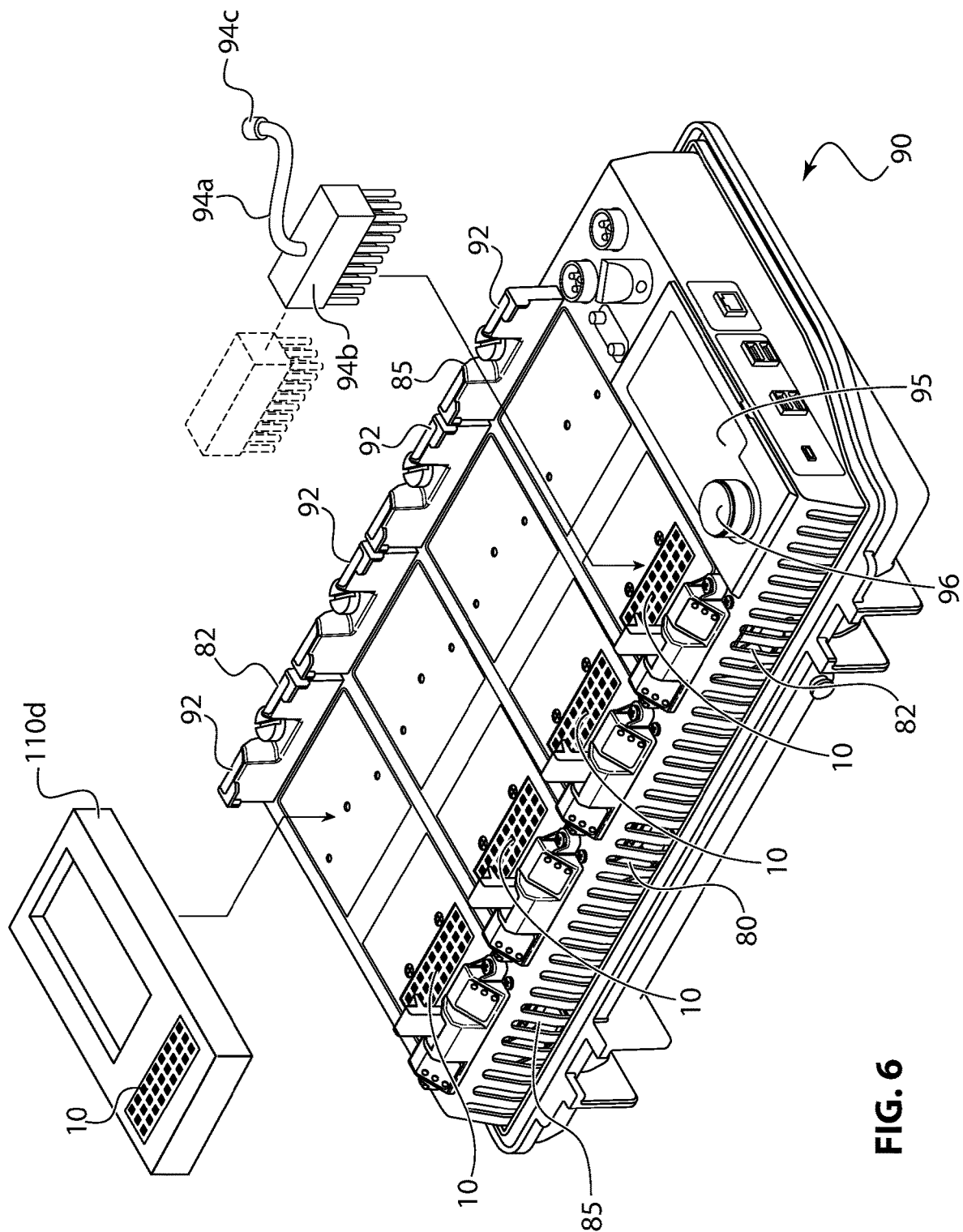
FIG. 6 is a perspective view of an embodiment of a battery charger chassis.

As can be seen in FIG. 6, the battery charger includes multiple sockets, for example, four ports or sockets each comprising a multi-slot female socket connector body 10 with integrally molded flange. Two different types of adapters 110a and 110b are shown in FIG. 7. Many other types of adapters are provided to receive various different batteries. One adapter is configured as a discharge adapter 110d which includes one or more channels to receive batteries to be discharged. The Supervisory Controller 200 senses the presence of the discharge adapter and a connected battery, and executes one of the discharge protocols. Certain batteries need to be discharged to 30% for safe transport. The Supervisory Controller would monitor the decreasing state of charge and terminate the discharging cycle when 30% SOC is reached. The discharge adapter may also include a multi-slot Jones-type connector to receive a battery-receiving adapter. In this manner the discharge adapter can remain installed without taking a port out of service.

The outer case of the charger has a contoured exterior wall, with a low point that is below the apertures. In this way, rain or other liquids entering the case, will drain out at the low point before the case fills up to the apertures, thus avoiding flooding into the chassis. The housing 100 is shown in FIG. 7 with a housing top 100t, a housing bottom 100b and a hinge 100h. The housing top pivots about the hinge to open and close the housing. The chassis 90 is removable from the housing for table top operation as shown in FIG. 6. The case cover can be removed by pulling the hinge pin 100p in an axial direction 100z. The housing includes a front side wall 102a having a height H and a back side wall 102b having a height L less than H. The housing includes side walls 102c with a contour that dips from height H to height L. Water collecting on the front side wall 102a runs along the left and right side walls 102c down along the contour dips and drains over the lowest rear side wall 102b. All four walls of the housing extend upwardly to partially enclose the chassis 90. All four walls of the housing terminate below the cooling apertures which are aligned with the cooling fans 80, 82 and 85.

In addition to the EMI shield, the charger also includes various ElectroMagnetic Interference (EMI) suppression devices. In FIG. 9 all of the components from the top of the schematic down to the four Connectors, i.e. the multi-slot female Jones-type connector, are contained within the battery charger chassis. The channels are separate circuits contained within the removable adapters. The below noted high power devices are provided within components contained in the battery charger chassis, or between such components along the solid lines.

The charger according to the invention includes one or more of the following Electromagnetic Interference (EMI) control features:

All high current switching signals have wave-shaping snubber networks in place to control ringing, rise and fall times. The use of snubbers controls EMI at the source. A snubber is an energy-absorbing circuit to suppress voltage spikes caused by the circuit's inductance when an electrical or mechanical switch opens. The snubber network includes a capacitor and a resistor connected in series across the switch. The snubber network is installed on the high power input to the charge control regulator, on the high power output of the charge control regulator or both.

Each of the high power circuits is isolated from each other with ferrite beads or inductors. This prevents high frequency currents from propagating throughout the board and controls any interaction that could occur between each circuit. The ferrite beads or inductors are installed on the high power input to the charge control regulator, on the high power output of the charge control regulator or both.

All of the internal high power DC-DC converters and chargers are synchronized to reduce cross talk, lower ripple currents, and lower ripple voltages. Synchronization also eliminates beat frequencies and makes filtering more effective.

All board to board interface signals contain low pass filter networks to attenuate high frequency signals that could become electromagnetic radiators.

All I/O signals coming into and out of the battery charger contain low-pass filter networks to prevent electromagnetic radiation.

The main input power leads go through an integrated high attenuation common mode and differential mode EMI filter.

The printed circuit board design of the power management module and the charge control regulator use extensive ground planes to reduce high current loops and shields high frequency signals.

Circuits are decoupled with large bypass capacitors as well as small high frequency capacitors The battery charger incorporates a metal chassis to help shield radiated emissions.

Connections between all I/O lines and the high speed signals between the display and the main board are kept as short as possible to reduce current loop areas, which in turn significantly reduces the source of interference.

The charger also includes one or both of the following Electrostatic Discharge (ESD) protection features:

All board to board interface signals contain transient voltage suppressors and RC (resistor/capacitor) filters to suppress ESD transients.

All I/O signals including the battery contacts contain transient voltage suppressors and multistage RC (resistor/capacitor) filters to control in-coming ESD transients. These suppressors are located along the dotted line paths between components.

When connected to an AC power source, one or both power supplies are active to convert the AC power source to suitable DC power for battery recharging. When operating in AC power source mode, all fans are operational with the lower fans drawing air into the chassis, and the upper fans exhausting air from the chassis. AC power sources generally provide consistent power levels. Alternatively, DC power sources like solar panels do not provide consistent power levels. In addition, the power supplies which function as AC to DC converters, are not operational in DC power source mode. To conserve available DC power for battery recharging, selected fans are shut down. In one scheme, the front center fan 80 is always on. The even fans 82 are then operated with odd fans 85 off. The operation of diagonally opposed fans creates cross-ventilation through the chassis. After a preset period of time, the even fans 82 are shut off, and odd fans 85 are turned on. This aspect of heat management comprises cycling between diagonally opposed fan pairs, when operating in DC power source mode. Cooling fan 80 and the corresponding cooling aperture within the chassis is designated as the fifth cooling fan. Even cooling fans 82 are designated as the cooling fan and the fourth cooling fan. Odd cooling fans 85 are designated as the second and third cooling fans. All five cooling fans are aligned with apertures in the front or back side of the chassis. Cooling fans on the front of the chassis including cooling fan 80 draw air into the housing. The other two cooling fans on the back of the chassis expel air out of the chassis. The cooling fans operate in different modes bases on the temperature of the amount of power being transmitted through the charger.

The charger is designed to operate from a range of DC sources from below 10V to over 30V, for example from 9V to 33V. DC input sources are connected directly to the Power Management Module since they do not require AC to DC conversion provided by the Power Supplies. A problem exists when charging from a soft DC source such as a solar panel or vehicle battery. If batteries are being recharged, they can easily draw more power than the soft DC source can supply. This can inadvertently drain a vehicle battery or result in general system underperformance, leaving a host of connected batteries uncharged. The supervisory controller is equipped with maximum power point tracking (MPPT) software. The MPPT software automatically senses if a DC source is soft or hard. It can switch the charger to low power mode to prevent inadvertent draining of a connected vehicle battery. If a solar panel is connected, the MPPT monitors the solar panel. The max power point of a solar panel is dynamic and changes based on the amount of sunlight it is receiving, cloud cover, sun impingement angle and temperature. As the solar panel performance changes, the MPPT detects its maximum power point and draws at that level to provide best battery recharging efficiency. The MPPT will also proportionally reduce charging power to all connected batteries to be less than the soft input voltage. The MPPT generally operates in the background constantly monitoring for inadequate power conditions. The MPPT will become active when a soft source is connected, and will display an indication to the user. If the outgoing recharging power approaches the level of the incoming power, MPPT will be activated to limit the outgoing power, by proportionally reducing the outgoing power. If AC and DC sources are connected, the charger will draw from the AC source and shut off the DC input. If the AC power goes down and a soft DC source is connected, MPPT will be automatically activated.

While the charge can accept between 9V and 33V input, it can charge batteries at higher or lower levels. For example, batteries can be charged between 0V and 33V, depending on the supervisory controller mode. A DC identification cable is provided which communicates with the supervisory controller to identify the DC source type. In one embodiment, a resistor is connected between conductors, and the cable may be color coded, for example to indicate cable to be used with a solar panel. The charger checks the resistance when the cable is connected and uses the sensed resistance to identify a source type. In response, the incoming power draw is limited, by activating MPPT. The temperature or other operating conditions may be monitored to provide maximum efficiency.

As discussed above, the charger ports require an adapter to receive a battery. Previously, all adapters were charging adapters. In several instances it is necessary to discharge a battery for testing, recycling or shipping. It would be desirable to discharge batteries while connected to the battery charger in order to utilize the charger's smart battery communications ability. Accordingly, a discharge adapter has been designed that plugs into the charger with the latch, as shown in FIGS. 3A and 3B. The discharge adapter receives a battery, and places it in communication with the charger's smart battery interface, while isolating it from the charging circuits. Instead, the discharge adapter couples the battery to an internal resistor. The resistor is thermally coupled to a heat sink which is cooled by fan. Fan power can be drawn from the charger or the connected battery.

Figure 2:
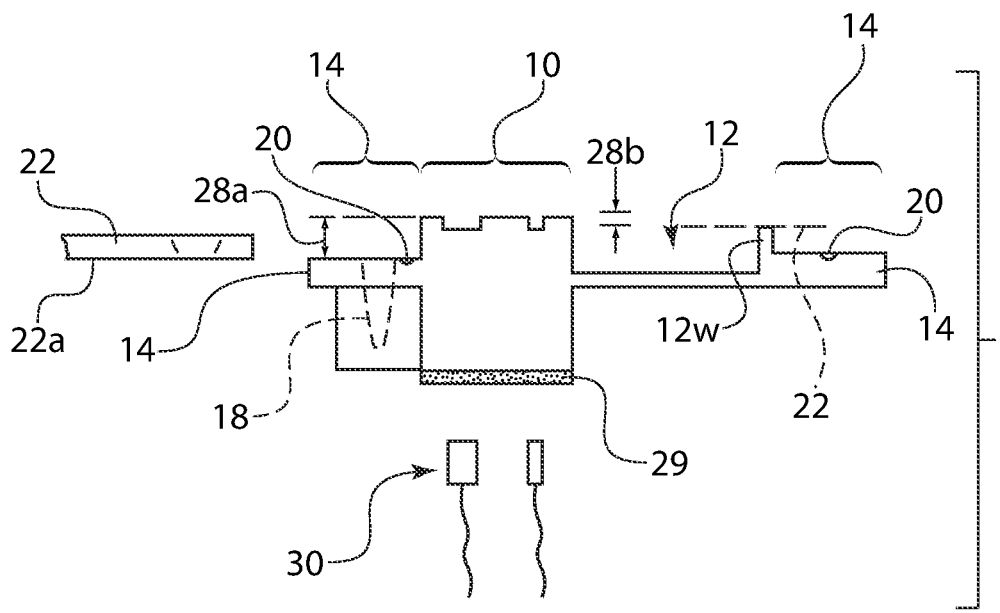
FIG. 2 is a cross-sectional view of the connector housing taken along the line II-II from FIG. 1.

The discharge adapter may include a port or channel to connect a charger adapter. The discharge adapter would provide a pass through connection, so that the charger adapter operates in the same manner as being plugged directly into the charger. The discharge adapter may include a rear hold down and pivoting front latch as shown in FIGS. 1 and 2. The rear hold down, or back stop 92 shown in FIG. 6, can be located in two positions, a rearward position to accommodate the longer new adapters, and a forward position to accommodate the shorter older adapters. The hold down supports the back edge of the adapter, while the front end is engaged by the latch and plugged in. Software within the discharge adapter will determine whether the discharge adapter is operating in charging or discharging mode. Battery state indicators, for example differently colored LEDs, may be provided on the discharge adapter. For safe shipping of high power batteries, particularly for military use, the batteries have to be discharged to 30 percent, that is, 30 percent state of charge. The discharge adapter may include software to monitor battery discharge, and provide an indication when 30 percent is reached and the battery is safe to ship. The software equipped discharge adapter can operate as a stand-alone discharger, powered by an internal battery or by the battery being discharged. Accordingly, the charger would not be needed to safely discharge a battery, so the discharge adapter can be field deployed in combination with the charger or as a separate unit.

When smart batteries undergo repeated partial discharge and charge cycles their internal indicators may falsely report State of Charge (SOC). Another application for the discharge adapter is to provide a software protocol to fully charge, then fully discharge a battery to re-calibrate the smart battery's internal State of Charge (SOC) indicator. During this operation, or other discharge operations, another depleted battery may be plugged into the discharge adapter. Power from the battery being discharged is routed to the depleted battery for charging.

Some advanced smart batteries contain multiple cells within them, and include an internal balancing circuit to selectively charge low cells and discharge high cells to bring those cells to an intermediate charge level even with other cells. The charger described herein includes software programmed in to the supervisory controller to activate the smart battery's internal balancing circuit. The supervisory controller includes a non-transitory computer readable medium including a program of instructions for operating the battery charger when executed by a computer. The smart battery would be plugged in to the charger, the user would select cell balancing maintenance function, and the charger would provide a low current charge to the smart battery to activate the battery's internal balancing circuit. When the battery reports that its cells are out of balance, the supervisory controller will alert the user by providing a warning indication on the display for that battery line item. The supervisory controller includes software to communicate with multiple smart battery communications protocols, for example, DQ and HDQ and SM bus.

The charger adapters discussed above are generally for medium sized communications and military batteries and also smaller AA and AAA batteries. Adapters for small batteries have the capability to accept three different types of batteries, rather than the standard two types. With two types, the adapter assigns one channel for each type. With three types, one channel is divided for charging two different types of batteries. These adapters will re-assign channel A, for example, to channel A(i) and A(ii). The adapter will have internal hardware and software to initiate distinct charging protocols for each battery type. The adapter includes a non-transitory computer readable medium including a program of instructions for identifying batteries, establishing channels, providing status display and implementing a charging or discharging protocol when executed by a computer. The regulator is used to charge one type, then switch to the other type under control of the adapter. The supervisory controller will update the display for channel A in to a two line display for each type. The adapter will provide additional indicators for the split channels, since the charger only has one set of indicators for each channel. When charging 4 AA batteries, the adapter includes circuitry to provide series charging of all four AA receivers, effectively using the assigned single regulator as 4 independent regulators. Accordingly, any number of AA batteries, from 1 to 4 can be recharged in any receiver or receivers.

While the present charger has sufficient power to charge large format batteries, the adapters are not configured or dimensioned to accept large format batteries. A large format battery (LFB) adapter is provided which is double width or wider, and will plug into 2, 3 or four ports and utilize 4, 6 or 8 channels. The LFB adapter is equipped with software to communicate to the charger supervisory controller that the correspond ports or channels are being used for LFB charging. In the case of a 2 port LFB adapter plugged into ports 1 and 2, the one power supply corresponding to those 2 ports can be dedicated to charging one LFB. In the case of a 2 port LFB adapter plugged into ports 2 and 3, both power supplies can be partially or fully used to charging one LFB. The LFB adapter can plug into ports 1 and 2, with the LFB sitting over port 1 and extending off the side of the adapter, while leaving room to charge small or medium sized batters over port 2. Other even larger batteries can be charged from the LFB adapter 94c by a connecting cable 94a. Cable 94a includes a Jones-type plug or plugs 94b that plugs into one of the female Jones-type connectors, as shown in FIG. 6. An extended plug shown in dotted line would allow plug 94b to plug into two female Jones-type connectors to draw additional power. In this manner, the LFB sits adjacent to the charger, and other ports remain available for charging other medium or small batteries.

The above text describes a variety of adapters that are used with the charger to receive a large number of different batteries. In field operations, and for military use, it is important to keep the adapters organized and protected when not in use. At any time one to four adapters may be mounted on the charger's four ports. The remaining eight plus adapters in the basic set-up will be unused. A separate case is provided for adapter storage. A stackable rack 120 shown in FIG. 8 has been designed to hold four adapters. The racks are stackable, with the case having capacity for three racks. The racks have a lower tray with ribs spanning across the width thereof, and open space in between the ribs to save weight. Two walls are set across the ribs to form compartments to hold and separate three adapters when placed in one rack. A tray channel extends across the ribs and is dimensioned to receive the male contacts which extend off the bottom of the adapters. The tray channel or frame 120f is deeper than the length of the contacts, to protect the contacts on three sides, while providing adequate clearance so the contacts are not touched or bent when the adapters are placed into and removed from the rack. On opposite sides of the rack, vertical U shaped handles are provided. The handles are set at an angle to accommodate nesting of racks. In this manner, a rack can be filled with three adapters and placed in the bottom of the case. The next rack will sit on top of the first rack in a secure manner.

Chargers for military and field use typically utilize a set of 2-3 LEDs to indicate battery charging status. For the first time, the present charger as shown in FIG. 6 had been equipped with a color display panel 95 and rotary encoder/selector switch 96. The supervisory controller can post eight line items of status corresponding to the eight channels. Each line provides the channel alpha-numeric designation, the battery type currently connected, the charging status and the State of Charge (SOC) as a percentage. The user can scroll through the lines with the rotary encoder and select a line by depressing the rotary encoder to pull up a full screen detail on the battery. The full screen detail could include any combination of battery model number, manufacture date, State of Charge, State of Health, cycle count, and fault status. For smart batteries, the display can also indicate temperature, capacity, and any other data stored within the batteries memory. A separate screen can provide detail on any installed adapters, such as port location, channel status, batteries mounted, and charging status. If an installed adapter contains a mixed stack, where one channel is divided into 2 channels, the line item for the channel can be expanded to show the sub-channel data. Personnel wearing cold weather gloves or combat gear can operate the rotary encoder. A single blackout switch can shut off all visible displays and LEDs.

The charger can simultaneously charge eight communications batteries with their radios attached. To protect the radios, each channel contains an over-voltage limiting circuit and backup over-voltage clamping circuit. If a mounted battery is not recognized by the supervisory controller, or does not communicate with the controller, it will not be charged and the user will be alerted on the display. For certain smart batteries, identification is established by a valid charge enable contact. For others, preset values of two thermistor contacts must be provided. In a separate location from the four ports, the charger includes Type A and C USB charging jacks along with a USB jack to receive software updates from a PC or USB Key. For example, to the right of display 95, on the side panel of the chassis, four USB jacks may be provided. The update is encrypted, and the supervisory controller will recognize the encryption, for example by having the update file provide a suitable formatted encryption key, and indicate the encryption is valid before downloading and installing the update.

The features and steps of the present invention can be implemented by hardware components, software components or an embodiment including both hardware and software elements. Features including the MPPT, adapter type identification, establishment of multiple channels on an adapter and smart battery identification and execution of charging or discharging protocols is implemented in software, which includes but is not limited to firmware, resident software, microcode, etc.

The invention may comprise a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The memory elements may include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, USB keys, cellular telephones etc.) may be coupled to the system either directly or through intervening I/O controllers.

Having described preferred embodiments of high capacity battery chargers, multi-slot female connectors, battery-receiving adapters, operational protocols, environmental management and (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A high capacity portable battery charger comprising:
a housing having a lower portion and removable upper portion, wherein the upper portion is hinged to the lower portion for opening and closing the housing;
a chassis having cooling apertures, wherein the chassis is mounted to the lower portion of the housing;
a power supply mounted to said chassis;
an electromagnetic interference shield having a top and two sides extending in a longitudinal direction covering said power supply and mounted to said chassis, said electromagnetic interference shield having two open ends;
a first cooling fan disposed between a first cooling aperture and one of the open ends; and
a wing devoid of sides extending from the top of said electromagnetic interference shield in the longitudinal direction toward said first cooling fan to direct air underneath said electromagnetic shield across said power supply.

2. A high capacity battery charger comprising:
a chassis having cooling apertures disposed within a housing;
a power supply mounted to said chassis;
an electromagnetic interference shield having a top and two sides extending in a longitudinal direction covering said power supply, said electromagnetic interference shield having two open ends, wherein said two sides extend down from said top in a parallel spaced configuration, wherein said top and two sides have an inverted U-shaped cross-section, and wherein said electromagnetic interference shield includes a flange at the bottom of at least one of the sides for mounting to said chassis;
a first cooling fan disposed between a first cooling aperture and one of the open ends; and
a wing extending from the top of said electromagnetic interference shield in the longitudinal direction toward said first cooling fan to direct air underneath said electromagnetic shield across said power supply.

3. The high capacity battery charger of claim 2, wherein said electromagnetic interference shield is devoid of sides below said wing.

4. The high capacity battery charger of claim 3, wherein said first cooling fan has a central axis, and wherein said wing is aligned with the central axis of said first cooling fan.

5. The high capacity battery charger of claim 2, wherein said chassis has a front side and a back side, wherein the first cooling aperture is in the front side, and wherein a second cooling aperture is in the back side, and wherein a second cooling fan is disposed between the second cooling aperture and the other open end.

6. The high capacity battery charger of claim 5, including:
a third cooling aperture in the front side and a fourth cooling aperture in the back side;
a second power supply and a second electromagnetic interference shield having a second wing and a third open end and a fourth open end mounted to said chassis; and
a third cooling fan disposed between the third aperture and the third open end and a fourth cooling fan disposed between the fourth aperture and the fourth open end.

7. The high capacity battery charger of claim 6, wherein the power supplies comprise rectifiers which are idle when the charger is receiving D.C. input power, wherein one front side cooling fan and one back side cooling fan are idle when the charger is receiving D.C. input power.

8. The high capacity battery charger of claim 7, wherein said first cooling fan in the front side and said fourth cooling fan in the back side operate at the same time on one diagonal D.C. input power cooling mode alternating with said second cooling fan in the back side and said third cooling fan in the front side operating at the same time in a second diagonal D.C. input power cooling mode.

9. The high capacity battery charger of claim 8, wherein the cooling fans on one side of the chassis draw air into the chassis, and wherein the cooling fans on the other side of the chassis expel air out of the chassis.

10. The high capacity battery charger of claim 6, further including a fifth cooling aperture and a fifth cooling fan aligned with the fifth cooling aperture which runs constantly when the battery charger is operating.

11. The high capacity battery charger of claim 10, wherein said five cooling fans operate in different modes based on a sensed internal temperature.

12. The high capacity battery charger of claim 6, wherein said power supply and said second power supply are each 400 W to 600 W power supplies.

13. The high capacity battery charger of claim 12, wherein said four cooling fans operate in different modes based on the wattage level within the charger.

14. The high capacity battery charger of claim 6, wherein said housing includes a lower portion and an upper portion that is hinged to said lower portion for opening and closing, wherein said upper portion is removable from the hinge.

15. The high capacity battery charger of claim 14, wherein said chassis is removably mounted to said lower portion of said housing.

16. The high capacity battery charger of claim 15, wherein said lower portion includes four side walls that extend upwardly to partially enclose the bottom of said chassis, and wherein said four side walls terminate below the cooling apertures.

17. The high capacity battery charger of claim 16, wherein said four side walls comprise:
a front side wall that extend upwardly to a height H;
a rear side wall that extends upwardly to a height L that is less than H;
a left and right side walls with a contour that dips from height H to L so that water collecting on the front side wall runs along the left and right side down along the contour dips and draining over said rear side wall outside of the housing.

18. A high capacity battery charger comprising:
a chassis having cooling apertures disposed within a housing;
a first power supply and a second power supply both mounted to said chassis;
a first electromagnetic interference shield and a second electromagnetic interference shield each having a top and two sides extending in a longitudinal direction covering said first and second power supply respectively, each of said electromagnetic interference shields having two open ends;
a first wing and a second wing; each extending from the top of said first and second electromagnetic interference shield respectively; and
a pair of cooling fans for each power supply including a drawing fan disposed between the wing and one of the cooling apertures and an expelling fan disposed opposite the wing and between the electromagnetic interference shield and a different one of the cooling apertures;
wherein each wing extends in the longitudinal direction toward said corresponding drawing fan to direct air underneath said corresponding electromagnetic shield across said corresponding power supply.

19. The high capacity battery charger of claim 18, wherein each fan of the pair of cooling fans and their corresponding apertures has a central axis that is aligned with the top of the electromagnetic shield.

20. The high capacity battery charger of claim 19, wherein in a low wattage power cooling mode the drawing fan in one pair is off and the expelling fan in the other pair is off.

21. The high capacity battery charger of claim 18, wherein in a low wattage power cooling mode the drawing fan in one pair is off and the expelling fan in the other pair is off.

22. The high capacity battery charger of claim 18, further including a static cooling fan which runs constantly when the battery charger is operating.

23. A high capacity battery charger comprising:
a chassis having cooling apertures disposed within a housing;
a power supply mounted to said chassis;
an electromagnetic interference shield having a top and two sides extending in a longitudinal direction covering said power supply, said electromagnetic interference shield having two open ends;
multiple power supply cooling fans, each disposed between one of the cooling apertures and one of the open ends and having a central axis that is aligned with the top of the electromagnetic shield in the longitudinal direction, wherein said power supply cooling fans operate on and off based on one of the wattage level and sensed internal temperature within the charger;
a wing extending from the top of said electromagnetic interference shield in the longitudinal direction toward one of said power supply cooling fans to direct air underneath said electromagnetic shield across said power supply; and
a static cooling fan which runs constantly when the battery charger is operating.

* * * * *